(12) United States Patent
Ogasawara et al.

(10) Patent No.: US 7,286,263 B2
(45) Date of Patent: Oct. 23, 2007

(54) COLOR IMAGE PROCESSING APPARATUS AND METHOD FOR REDUCING INK BLEEDING

(75) Inventors: Fumihiko Ogasawara, Saitama (JP); Takeshi Nishimura, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 974 days.

(21) Appl. No.: 10/345,922

(22) Filed: Jan. 17, 2003

(65) Prior Publication Data

US 2004/0001211 A1    Jan. 1, 2004

(30) Foreign Application Priority Data

Jun. 28, 2002   (JP)   ............................. 2002-189358

(51) Int. Cl.
   *G06F 15/00*   (2006.01)
(52) U.S. Cl. ........................... 358/1.9; 347/14; 347/15; 347/41
(58) Field of Classification Search ................. 358/1.9; 347/14, 15, 41
   See application file for complete search history.

(56) References Cited

U.S. PATENT DOCUMENTS

| | | | |
|---|---|---|---|
| 5,428,377 A | * | 6/1995 | Stoffel et al. .................. 347/15 |
| 6,270,186 B1 | * | 8/2001 | Smith et al. ................... 347/41 |
| 6,290,330 B1 | * | 9/2001 | Torpey et al. ................. 347/43 |
| 6,361,144 B1 | * | 3/2002 | Torpey et al. ................. 347/43 |
| 6,669,331 B2 | * | 12/2003 | Teshigawara et al. ......... 347/43 |
| 6,805,422 B2 | * | 10/2004 | Takahashi et al. ............ 347/15 |

FOREIGN PATENT DOCUMENTS

| | | |
|---|---|---|
| JP | A 6-113155 | 4/1994 |
| JP | A 10-67125 | 3/1998 |
| JP | A 10-86503 | 4/1998 |
| JP | A 11-77992 | 3/1999 |

* cited by examiner

*Primary Examiner*—Twyler Lamb
*Assistant Examiner*—Jacky X. Zheng
(74) *Attorney, Agent, or Firm*—Oliff & Berridge, PLC

(57) ABSTRACT

A color image processing apparatus includes a first unit that predicts a bleeding occurrence level from input image data, a second unit that replaces pixels in a given area including boundaries between black ink and any of color inks with another pixels in accordance with the bleeding occurrence level, and a third unit that controls switching of multiple printing modes for each main scan in accordance with the bleeding occurrence level.

2 Claims, 13 Drawing Sheets

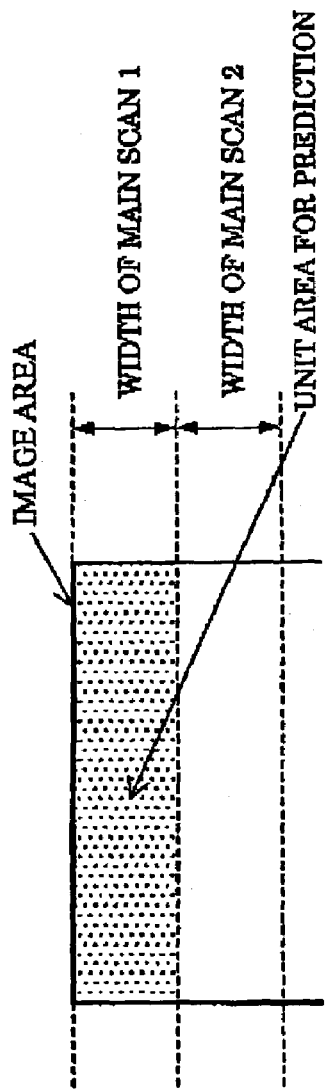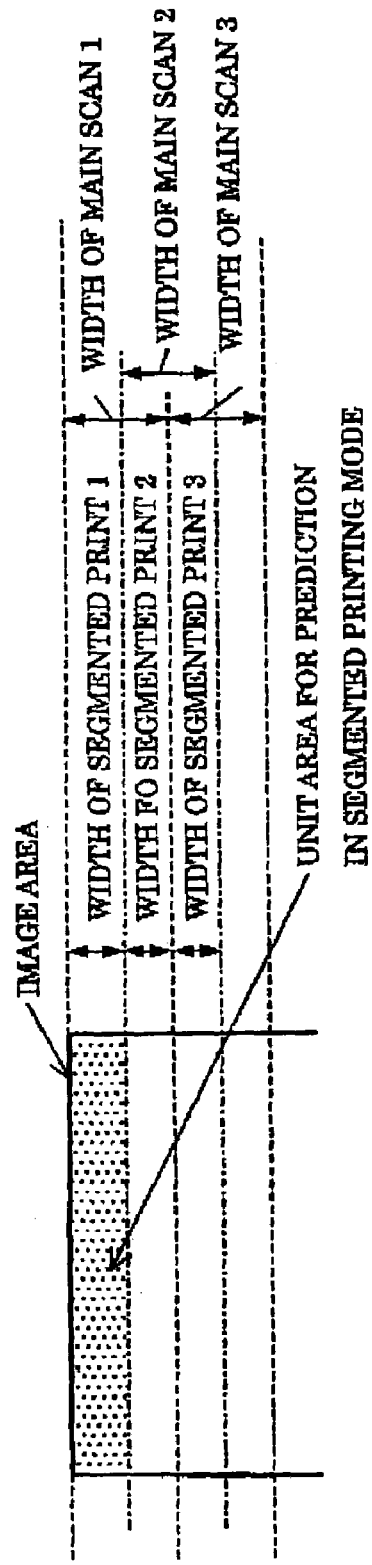

Fig. 5

| PREDICTION OCCRRENCE LEVEL | PIXEL REPLACEMENT RULE | PRINTING CONTROL |
|---|---|---|
| LOW | WEAK | NONE |
| INTERMEDIATE | WEAK | NONE |
| HIGH | STRONG | ACTIVE |

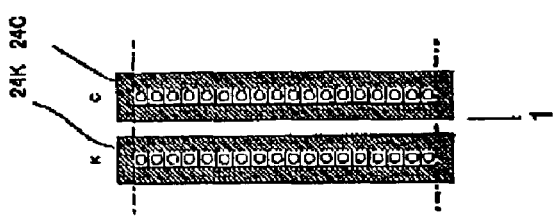
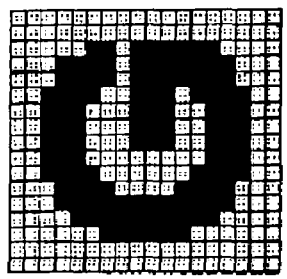
Fig. 7A
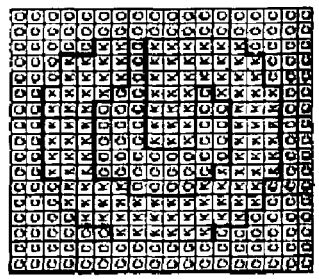
Fig. 7B
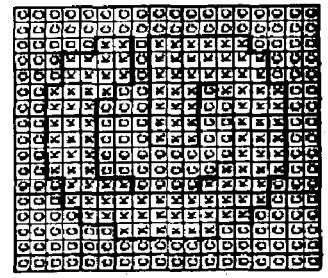
Fig. 7C

Fig. 8
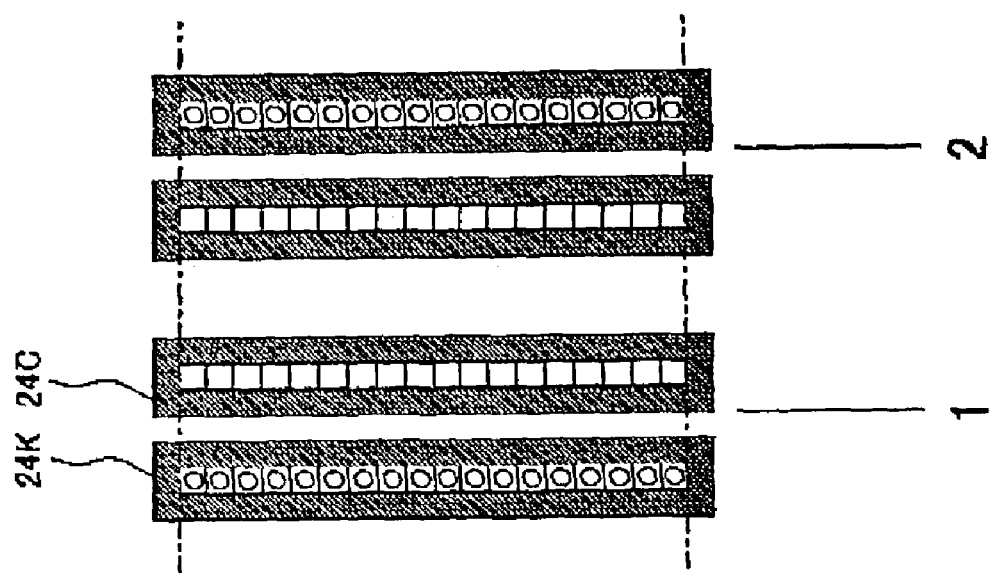
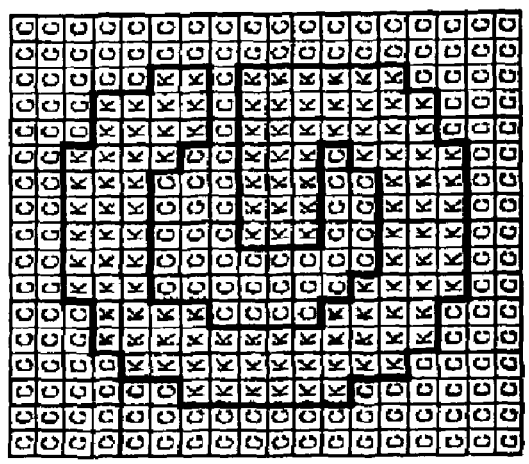
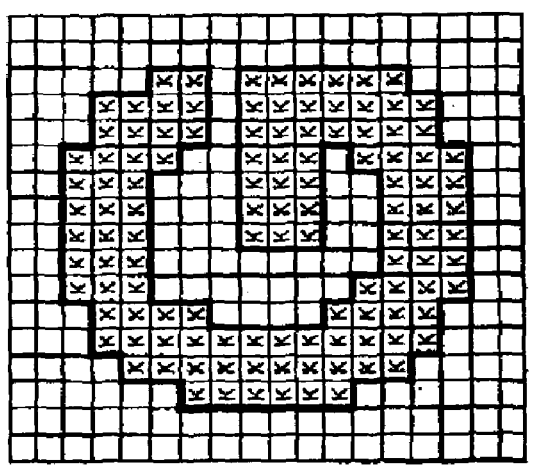

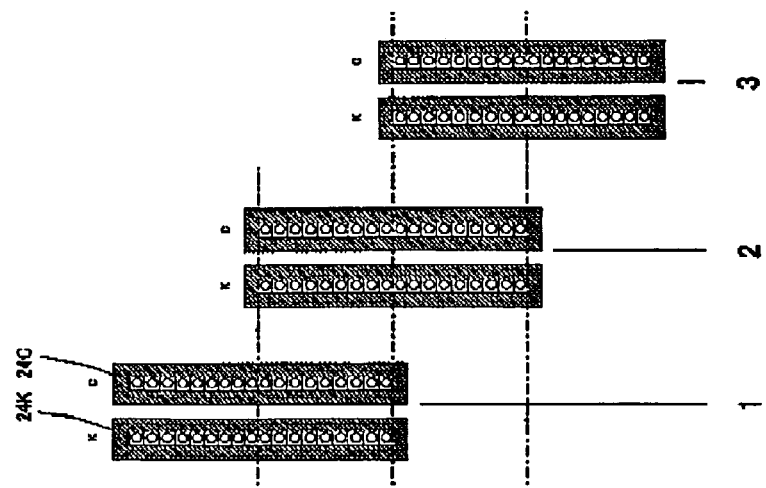
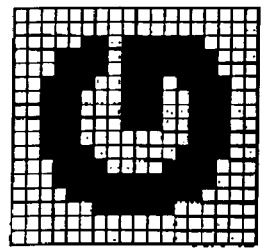
Fig. 9A
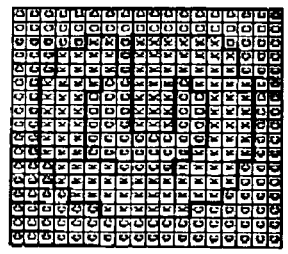
Fig. 9B
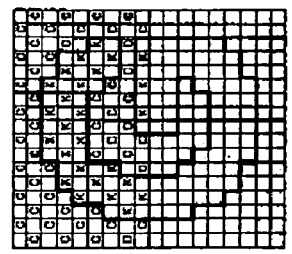
Fig. 9C

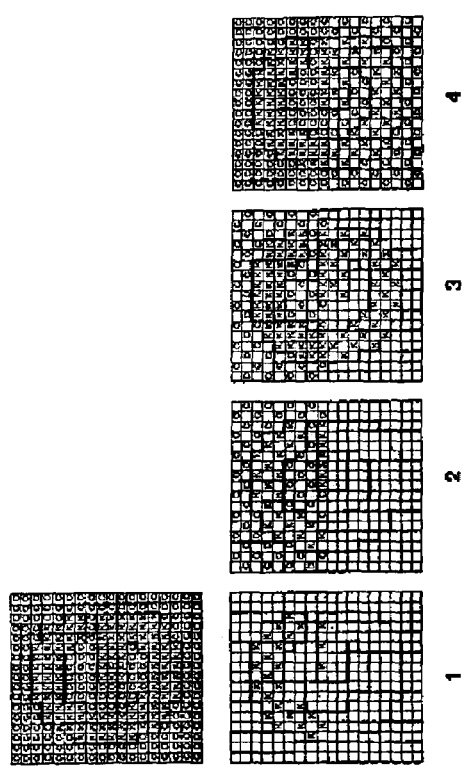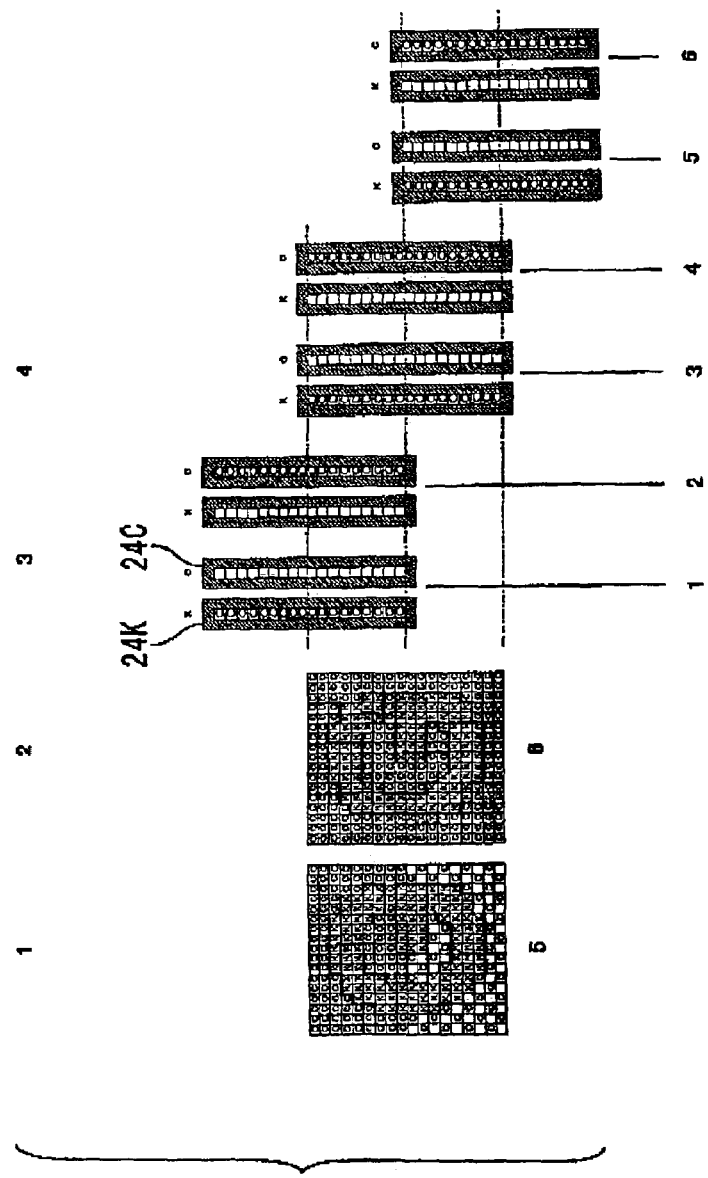
Fig. 11A
Fig. 11B

Fig. 13

| | DEGREE OF BLEEDING | PRINTING SPEED (1 IN NO CONTROL) |
|---|---|---|
| NO CONTROL | × | 1 |
| PIXEL CONVERSION ONLY | △ | 1 |
| PRINTING CONTROL ONLY | ○ | 0.5 |
| CONTROL BY INVENTION | ○ | 0.68 |

COLOR IMAGE PROCESSING APPARATUS AND METHOD FOR REDUCING INK BLEEDING

BACKGROUND OF THE INVENTION

1. Field of the Invention

The present invention relates to a color image processing apparatus and method adaptable to a printing machine that uses black ink and multiple color inks, and more particularly, to a color image processing apparatus and method capable of forming good color images on ordinary or plain paper with reduced ink bleeding.

2. Description of the Related Art

The color inkjet method ejects a drop of ink liquid from a nozzle for recording images. An apparatus that uses the color inkjet method has a simple structure and makes small noise. Generally, the color inkjet method is suitable for compact printing machines. Generally, the color inkjet method needs coated paper having an ink absorption layer in order to form high quality images with small ink bleeding. When images are reproduced on ordinary paper such as copy paper, ink bleeding is likely to occur at boundaries between different colors.

There is known a method of suppressing intercolor bleeding by enhancing the penetrance of ink to paper. However, enhancement of the ink penetrance causes a problem (fethering) of losing the sharpness of edges of printed lines and characters. This problem is conspicuous particularly for black ink. Taking into consideration the above, it is attempted to use a black ink having comparatively low penetrance and color inks having comparatively high penetrance in order to improve the quality of printed images of lines and characters and suppress intercolor bleeding. However, this attempt fails to avoid bleeding between black ink and any of color inks at boundaries therebetween.

A proposal that intends to eliminate the above problem is described in, for example, Japanese Unexamined Patent Publication Nos. 6-113155 and 10-86503. The proposal employs means for replacing some pixels by other pixels at a boundary between an area formed by black ink and an area formed by color inks. This pixel replacement may suppress bleeding between black ink and color inks so that the image quality can be improved.

However, if the pixel replacement is too much applied at the boundary, another problem may occur. If too many color pixels at the boundary are replaced by blank data, the boundary may be lost. If too many black pixels at the boundary are replaced by color inks, the replaced area will have a brightness lower than that of black ink, so that the image has a higher brightness and does not have an enough density as a whole. This degrades the image quality. As described above, there is a possibility that the image quality may be degraded if the pixel replacement is too much applied at the boundary.

Another proposal to avoid bleeding between black ink and color inks is described in Japanese Unexamined Patent Publication No. 10-67125. According to this proposal, black ink and color inks are subject to separate scans for printing. There is a time interval between print with black ink and print with color inks. The time interval effectively suppresses bleeding. However, the printing speed is greatly reduced.

Japanese Unexamined Patent Publication No. 11-77992 proposes to count a recording density from image data and select a suitable one of recording modes on the basis of the recording density. The recording density is defined as a ratio of the number of data bits to be recorded by once main scan to the maximum number of dots recordable by once main scan. The recording density is compared with given threshold values. The recording mode is switched based on the comparison result. The multiple recording modes may have mutually different recording speeds. When the relatively low recording mode is selected, bleeding may be improved. However, the relatively low recording mode may be selected for image data in which the possibility of occurrence of bleeding is low although the recording density is high (such an image data is, for example, a picture-based image such as a photograph). Thus, the recording speed will be unnecessarily set low, so that the printing time increases.

SUMMARY OF THE INVENTION

The present invention has been made in view of the above circumstances and provides a color image processing apparatus and method.

According to an aspect of the present invention, there is provided a color image processing apparatus including: a first unit that predicts a bleeding occurrence level from input image data; a second unit that replaces pixels in a given area including boundaries between black ink and any of color inks with another pixels in accordance with the bleeding occurrence level; and a third unit that controls switching of multiple printing modes for each main scan in accordance with the bleeding occurrence level.

According to another aspect of the present invention, there is provided a method of color image processing including the steps of: predicting a bleeding occurrence level from input image data; replacing pixels in a given area including boundaries between black ink and any of color inks with another pixels in accordance with the bleeding occurrence level; and controlling switching of multiple printing modes for each main scan in accordance with the bleeding occurrence level.

BRIEF DESCRIPTION OF THE DRAWINGS

Preferred embodiments of the present invention will be described in detail based on the following figures, wherein:

FIGS. 4A and 4B illustrates a relationship between a process for predicting the bleeding occurrence level and a printing mode;

FIG. 5 illustrates a relationship among the bleeding occurrence level, a pixel replacement rule and a printing control;

FIGS. 7A, 7B and 7C illustrate a printing mode;

FIG. 8 illustrates another printing mode;

FIGS. 9A, 9B and 9C illustrate yet another printing mode;

FIGS. 11A and 11B illustrate a still further printing mode;

FIG. 13 illustrates improvements in bleeding and printing speed by the present invention as compared to comparative examples.

DESCRIPTION OF THE PREFERRED EMBODIMENTS

A description will now be given of embodiments of the present invention with reference to the accompanying drawings.

Figure 1:
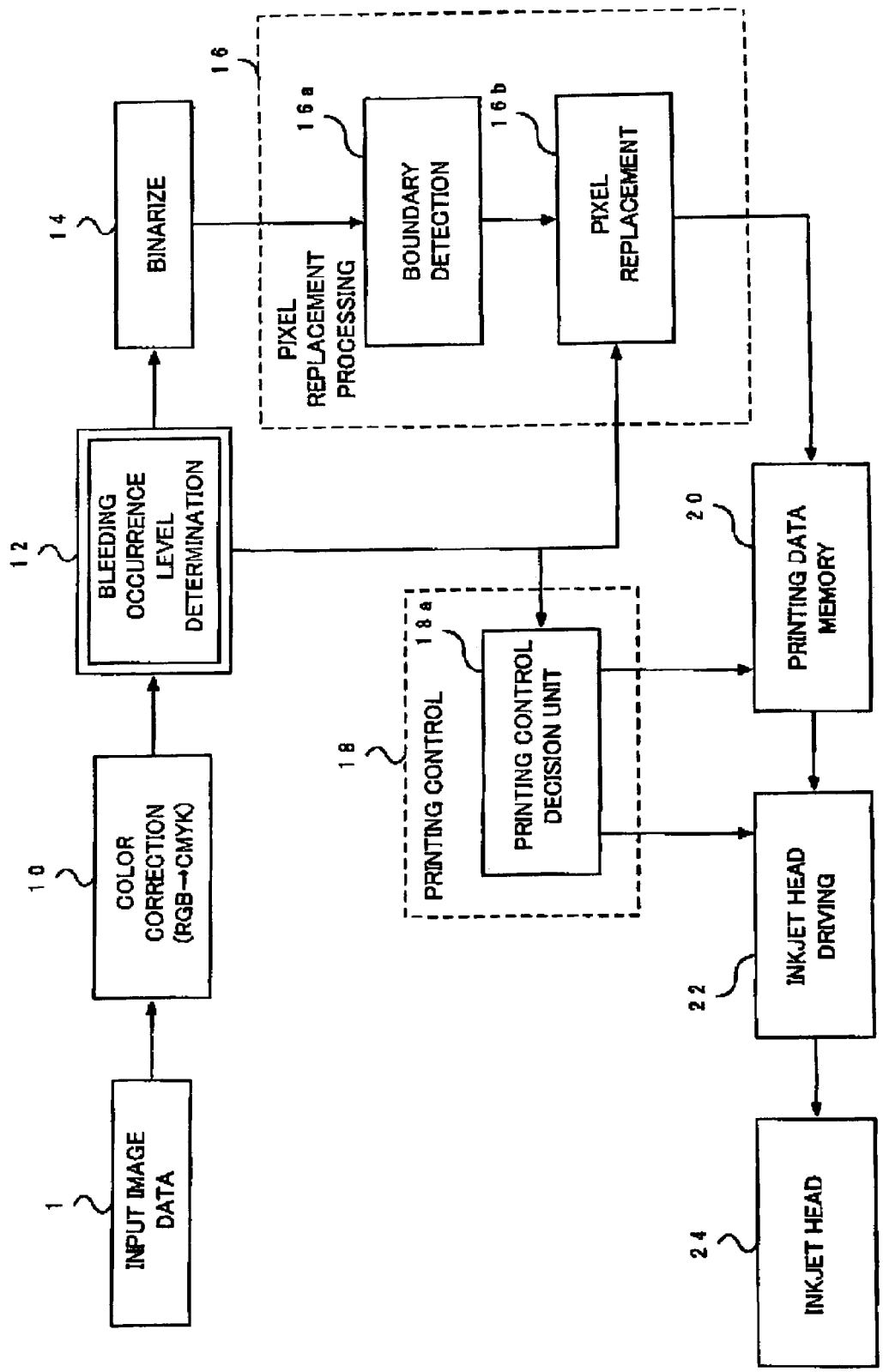
FIG. 1 is a block diagram of a color image processing apparatus according to an embodiment of the present invention.

FIG. 1 is a block diagram of a color image processing apparatus according to an embodiment of the present invention. The image processing apparatus includes a color correcting unit 10, a bleeding-occurrence-level determination unit 12 serving as a first unit, a binarizing unit 14, a pixel replacement unit 16 serving as a second unit, a printing control unit 18 serving as a third unit, a printing data memory unit 20, and an inkjet head driving unit 22 that drives an inkjet head 24. The bleeding-occurrence-level determination unit 12 predicts a bleeding occurrence level, which may indicate degree of the possibility of bleeding. The bleeding occurrence level is used to control the pixel replacement processing unit 16 and the printing control unit 18, so that a suitable pixel replacement rule and a suitable printing mode can be selected. Thus, bleeding can be suppressed, and simultaneously, decrease of the printing speed can be minimized. As a result, both the image quality and the printing speed can be optimized.

The color correction unit 10 converts input image data 1 in the RGB color space into multivalued image data in the CMYK color space. Color correction can be made in the color space conversion process.

The bleeding-occurrence-level determination unit 12 predicts the degree of bleeding on printed images, and generates the bleeding occurrence level indicative of the predicted degree of bleeding. The bleeding occurrence level is applied to the pixel replacement processing unit 16 and the printing control unit 18 as determined information. Several methods of predicting the bleeding occurrence level are available. For example, the bleeding-occurrence-level determination unit 12 counts the number of boundaries between black ink (black pixels) and any of color inks (color pixels) and the quantity of inks from input image data, and predicts the bleeding occurrence level by using at least one of the number of boundaries and the quantity of inks. For segmented print that will be described later, the unit 12 counts, for each segmented prints the number of boundaries between black ink and any of color inks and the quantity of inks from input image data, and predicts the degree of bleeding by using at least one of the number of boundaries and the quantity of inks. The way of predicting the bleeding occurrence level will be described later.

The binarizing unit 14 converts the multivalued image data in the CMYK color space into binary data.

Based on the bleeding occurrence level, the pixel replacement processing unit 16 performs pixel replacement in which print information is replaced with another information within a given area including the boundaries at which black ink and color inks face each other. The given area may merely be referred to as a boundary. The unit 16 includes a boundary detection unit 16a and a pixel replacement unit 16b. The boundary detection unit 16a detects the boundaries within which pixel replacement is performed. The pixel replacement includes pixel decimation in which black or color pixel is replaced by blank (white) pixel. The pixel replacement unit 16 performs pixel replacement at the boundaries (more strictly, within a given area including the real boundaries at which the pixels are directly adjacent). In this regard, it can be said that pixel replacement is carried out within the given boundary area. The pixel replacement intends to reduce bleeding. The pixel replacement unit 16b has multiple replacement rules, and selects one of them based on the bleeding occurrence level for pixel replacement.

Based on the bleeding occurrence level, the printing control unit 18 selects a suitable one of multiple printing modes for each main scan. The printing control unit 18 includes a decision unit 18a for making a decision as to whether printing control should be carried out on the basis of the bleeding occurrence level. The decision unit 18a selects one of the printing modes based on the bleeding occurrence level. The multiple printing modes include a printing mode in which black ink and color inks are separately ejected in respective scans. The multiple printing modes include another printing mode in which black ink and color inks are ejected in the same scan in such a way that black ink and color inks to be printed are not adjacent to each other.

The decision unit 18a controls the printing data memory unit 20 and the inkjet head driving unit 22 on the basis of the selected printing mode. Recording data is read from the memory unit 20 in accordance with the selected printing mode, and is output to the inkjet head driving unit 22. Then, the unit 22 generates a signal for driving the inkjet head 24 in accordance with the selected printing mode. The inkjet head 24 has inkjet heads for YMCK, and ejects black and color inks toward a recording medium such as plain or ordinary paper.

Figure 2:
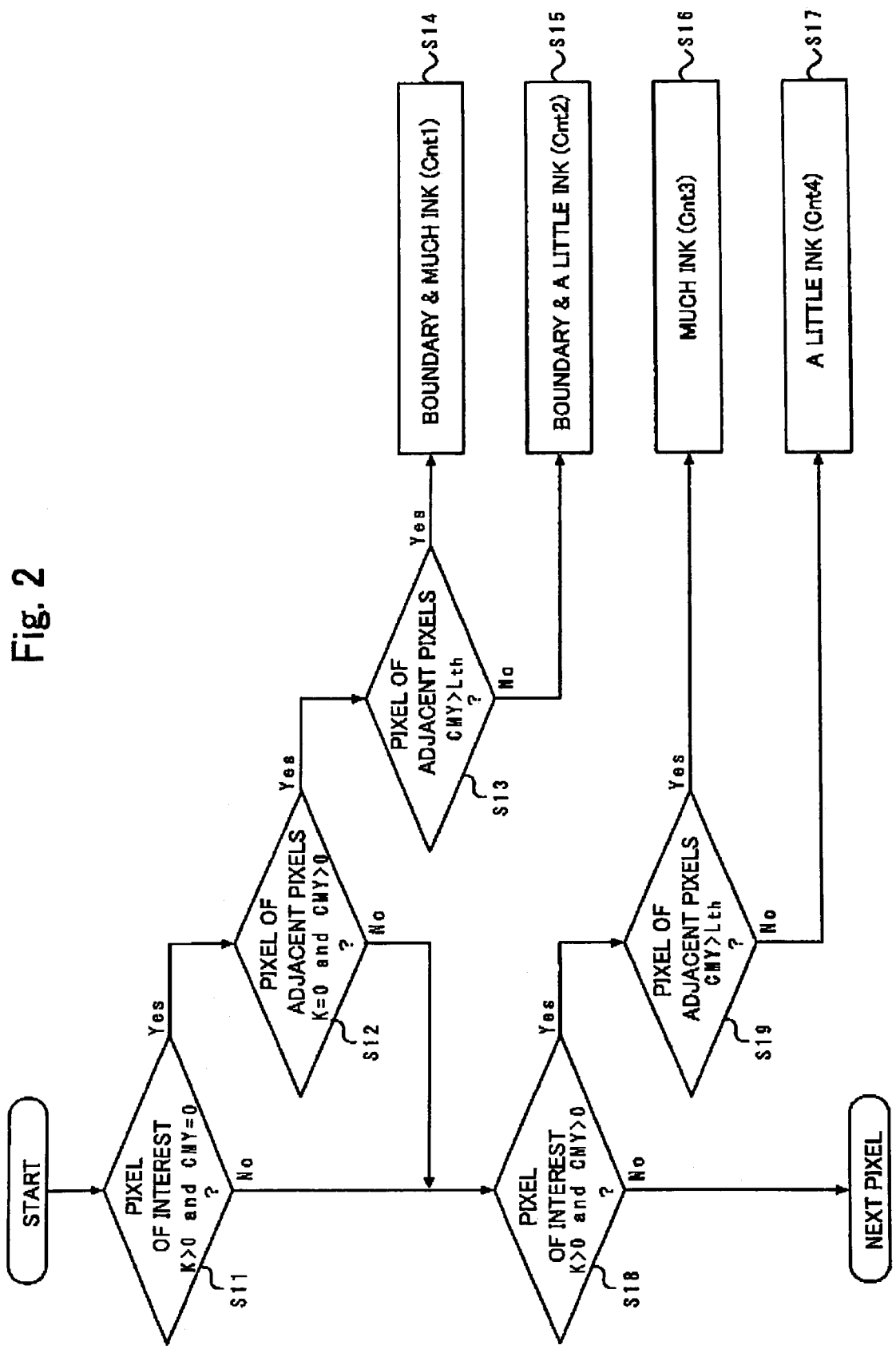
FIG. 2 is a flowchart of an operation of a bleeding occurrence level determination unit shown in FIG. 1.
Figure 3:
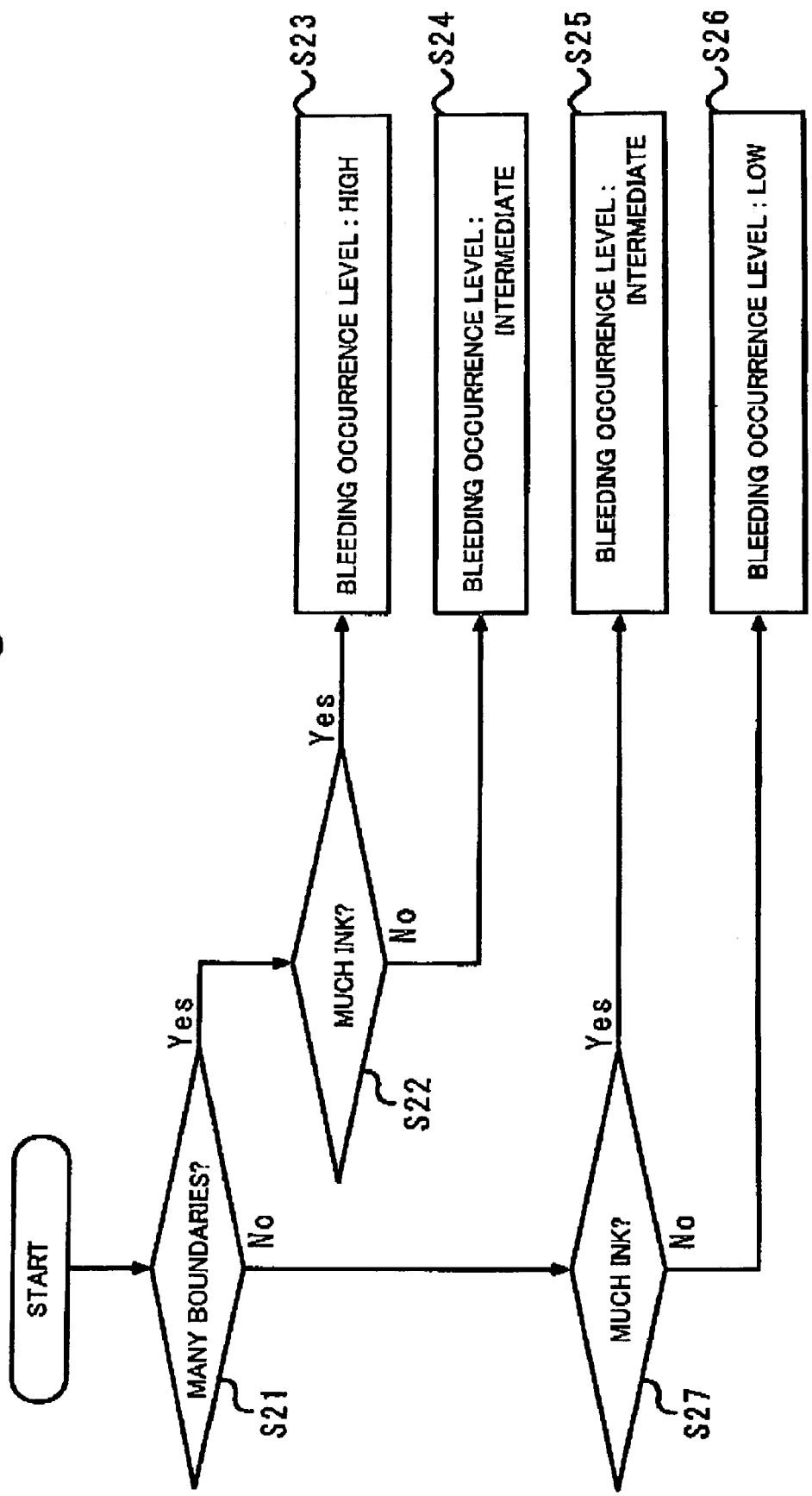
FIG. 3 is a flowchart of a subsequent operation of the bleeding occurrence level determination unit.

The bleeding occurrence level determination unit 12 will now be described in detail with reference to FIGS. 2 and 3. FIGS. 2 and 3 are flowcharts of a bleeding occurrence level determination algorithm. More particularly, the flowchart of FIG. 2 includes a process for determining, for each pixel, whether the pixel of interest is located at the boundary, and another process for determining whether color pixel or pixels adjacent to the pixel of interest have a large quantity of ink. The flowchart of FIG. 3 includes a process for predicting the bleeding occurrence level using the results obtained by the process shown in FIG. 2.

Referring to FIG. 2, the bleeding occurrence level determination unit 12 determines, whether the pixel of interest is pure black (K=100%), namely, whether K>0 and CMY=0 (step S11). If the answer is YES, the unit 12 determines whether pixels adjacent to the pixel of interest have a color other than black, namely, whether the adjacent pixels satisfy K=0 and CMY>0 (step S12). In this determination, pixels adjacent to the pixel of interest in, for example, two directions (for example, pixels located at the upper and left sides of the pixel of interest) may be checked. If the answer of step S12 is YES, the unit 12 determines whether the quantity of color inks of the adjacent pixels exceeds a given threshold level Lth (step S13). If the answer of step S13 is YES, the unit 12 increments a counter Cnt1 by 1 (step S14). The counter cnt1 counts the number of pixels of interest each being located at the boundary and adjacent to color pixels having a comparatively large quantity (greater than the given threshold level Lth). In contrast, if the answer of step S13 is NO, the unit 12 increments another counter Cnt2 by 1 (step S15). The counter cont2 counts the number of pixels of interest each being located at the boundary and adjacent to color pixels having a comparatively small quantity of inks (equal to or lower than the given threshold level Lth). In case the answer of step S11 or S12 is NO, the unit 12 determines whether the pixel of interest has a certain color, namely, whether the pixel of interest satisfies that K>0 and CMY>0 (step S18). In other words, it is determined whether the pixel of interest contains black and color inks. If the answer of step S18 is NO, the unit 12 moves to the next pixel of interest and executes step S11 again. If the answer of step S18 is YES, the unit 12 determines whether the quantity of inks of the adjacent color pixels exceeds the threshold level Lth, namely, whether the quantity of inks of the adjacent pixels satisfies CMY>0 (step S19). If the answer of step S19 is YES, the unit 12 increments yet another counter Cnt3 by 1 (step S16). If the answer of step S19 is NO, the unit 12 increments a further counter Cnt4 by 1 (step S17). After any of steps S14-S17 is completed, the unit 12 proceeds to the next pixel of interest.

As described above, for each main scan, the process of FIG. 2 determines whether the pixel of interest is located at a boundary, and counts the number of boundaries at each of which the pure black pixel (K=100%, that is, K>0, CMY=0) is adjacent to at least one color pixel other than while and the quantity of inks of the adjacent pixels. The counters Cnt1 and Cnt2 implement the above counting. In addition, for each main scan, the counters Cnt3 and Cnt4 measure the quantities of inks other than while regardless of boundaries. More particularly, the first counter Cnt updates its count value when the pixel of interest is a pure black pixel (K=100%) and the quantity of inks of pixels adjacent to the pixel of interest exceeds the threshold level Lth. The second counter Cnt2 updates its count value when the pixel of interest is a pure, black pixel (K100%) and the quantity of inks of pixels adjacent to the pixel of interest is equal to or lower than the threshold level Lth. The third counter Cnt3 updates its count value when the pixel of interest contains black and color components (K>0, CMY>Lth) and the quantity of inks of pixels adjacent to the pixel of interest exceeds the threshold level Lth. The fourth counter Cnt 4 updates its count value when the pixel of interest contains black and color components (K>0, CMY>Lth) and the quantity of inks of pixels adjacent to the pixel of interest is equal to or lower than the threshold level.

It is to be noted that there are many boundaries between black pixels and color pixels adjacent thereto in text/graphics-based images having black lines and/or characters in a color background. At many boundaries, pixels of K=100% and CMY=0% exist. Such boundaries can be handled by a feature of text/graphics images. At such boundaries, bleeding is likely to occur. According to one aspect of the present inventions the quantity of inks at the boundaries is additionally used to predict the bleeding occurrence level. The use of the quantity of inks at the boundaries makes it possible to determine the degree of occurrence of bleeding. In contrast, an image having a small number of boundaries or no boundary is characterized as a picture-based image such as a photograph. In other words, a very small number of pixels of K=100% and CMY=0% exists. Originally, there is a small possibility that bleeding occurs in the picture-based image and bleeding is not visible even if there is bleeding therein. In this case, there may be no need to activate the printing control. As described above, the bleeding occurrence level After each pixel is subject to the process of FIG. 2, the bleeding-occurrence-level determination unit 12 commences to execute the process of FIG. 3. First, the unit determines whether the sum of the values counted by the counters Cnt1 and Cnt2 exceeds a predetermined threshold value (step S21). If the answer of step S21 is YES, it is determined that there is a lot of boundaries. Then, the process proceeds to step S22, at which the unit 12 determines the quantity of ink is comparatively large. The above determination may be done by determining which one of the values of the counters Cnt1 and Cnt2 is larger than the other. For example, if the value of the counter Cnt1 is larger than that of the counter Cnt2, it is determined that the quantity of inks is large. If the answer of step S22 is YES, it is recognized that the image to be recorded is a text/graphics-based image such as a text or graph and has a large total quantity of inks at the boundaries, and it is thus concluded that the bleeding occurrence level is high (step S23). The determination unit 12 outputs a level value indicative of a comparatively high possibility of bleeding. At the "high" bleeding occurrence level, both the pixel replacement and the printing control are activated. In contrast, if the answer of step S22 is NO, it is recognized that the image to be recorded is a text/graphics-based image but has a comparatively small quantity of inks at the boundaries, and it is thus concluded that the bleeding occurrence level is intermediate (step S24). The determination unit 12 outputs a level value that indicates an intermediate possibility of bleeding. At the "intermediate" bleeding occurrence level, only the pixel replacement is performed and the printing control is not initiated. If the answer of step S21 is NO, the unit 21 determines that the image to be recorded is a picture-based image such as a photograph, and proceeds to step S27 at which it is determined whether the quantity of inks is large. This determination may be done by determining which one of the values of the counters Cnt3 and Cnt4 is larger than the other. If the answer of step S27 is YES, it is recognized that the image to be recorded is a picture-based image but may be indistinct due to the large quantity of inks, and it is thus concluded that the bleeding occurrence level is intermediate (step S25). The determination unit 12 outputs a level value that indicates an "intermediate" possibility of bleeding. The "intermediate" levels at steps S24 and 25 may be identical to or different from each other. If the answer of step S27 is NO, it is recognized that the image to be recorded is unlikely to be indistinct and is therefore concluded that the bleeding occurrence level is low (step S26). The determination unit 12 outputs a level value that indicates a comparatively low possibility of bleeding.

As described above, the bleeding occurrence level is predicted by determining, based on the number of boundaries, how many boundaries at which bleeding may occur exist and how much inks are used at the boundaries and determining how much inks are used regardless of boundaries. For example, when there are many boundaries and much inks are used at the boundaries, the "high" bleeding occurrence level is predicted. When there are may boundaries but much inks are not used at the boundaries, the "intermediate" bleeding occurrence level is predicted. When there is no boundary, the "low" or "intermediate" bleeding occurrence level is predicted. The prediction of bleeding occurrence level on the main scan basis makes it possible to dynamically select the optimum anti-bleeding process, which may include pixel replacement and printing control as necessary. Further, the bleeding occurrence level can accurately be predicted due to the use of not only the number of boundaries but also the quantity of inks. It is therefore possible to effectively avoid occurrence of bleeding.

In the foregoing, the bleeding occurrence level is predicted on the main scan basis. Preferably, the prediction target range that is subject to the prediction of bleeding occurrence level may be changed in accordance with the printing mode to be selected. That is, the individual printing modes have respective prediction target ranges that are subject to the prediction of bleeding occurrence level.

FIGS. 4A and 4B show the relationships between printing modes and prediction target ranges associated herewith. More particularly, FIG. 4A relates to a batch (normal) printing mode, and FIG. 4B relates to a segmented printing mode. In FIG. 4A, the bleeding occurrence level is predicted on the main scan width basis. The main scan width corresponds to the width of the inkjet heads. In FIG. 4A "WIDTH OF MAIN SCAN 1" and "WIDTH OF MAIN SCAN 2" denote the width (band) of the main scan, and each prediction target range on image corresponding to the main scan width is the unit of predicting the bleeding occurrence level. For segmented print shown in FIG. 4B, the bleeding occurrence level is predicted on the segmented-print-width basis. If the different bleeding occurrence levels are predicted for the segmented print widths, the highest bleeding occurrence level will be selected, so that occurrence of bleeding can be avoided. If it is desired to more accurately predict the bleeding occurrence level, the prediction target range may be divided into some parts. In the batch printing mode, as shown in FIG. 4B, the width of the main scan is divided into two parts, each of which is subject to the prediction of bleeding occurrence level. In the segmented printing mode, the width of the segmented print is divided into parts, each of which is subject to the prediction of bleeding occurrence level.

The pixel replacement processing unit 16 and the printing control unit 18 operate on the basis of the bleeding occurrence levels obtained at steps S23-S26 as shown in FIG. 5. When the predicted bleeding occurrence level is low (step S26), only the pixel replacement is carried out, so that bleeding can be avoided without decreasing the printing speed. In this case, printing is carried out at a regular printing speed in a regular printing mode. When the predicted bleeding occurrence level is high (step S23), the printing mode is additionally activated, so that bleeding can be avoided in a situation in which bleeding cannot be suppressed effectively by the pixel replacement only. The rule of the pixel replacement is changed in accordance with the predicted bleeding occurrence level. As shown in FIG. 5, when the predicted bleeding occurrence level is "high" or "low", a relatively weak pixel replacement rule is selected. When the predicted bleeding occurrence level is "intermediate", a relatively strong pixel replacement rule is selected. It is therefore possible to realize both the avoidance of bleeding and the optimization of the printing speed.

Figure 6C:
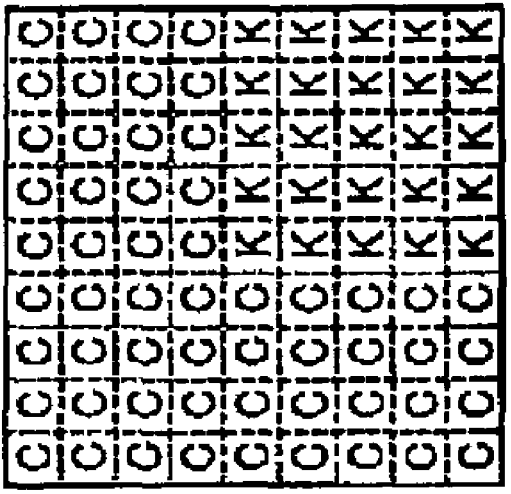
FIGS. 6A, 6B and 6C illustrate examples of the pixel replacement rule.
Figure 6B:
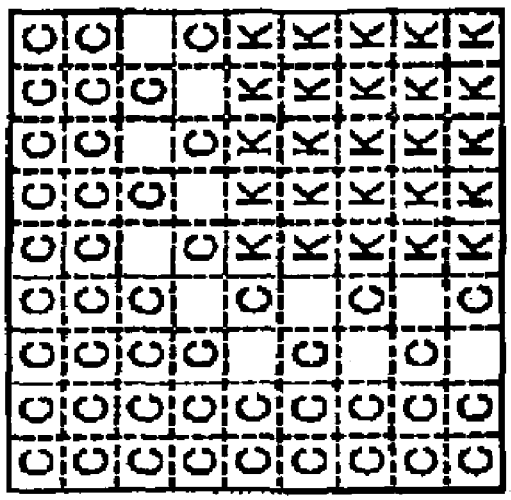
Figure 6A:
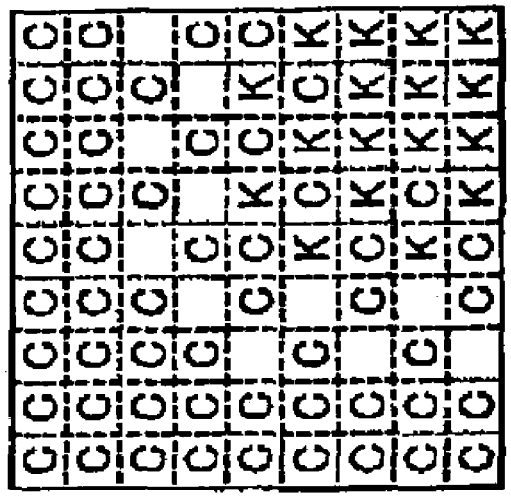

For example, if the predicted bleeding occurrence level is "high" or "low", original image data shown in FIG. 6A is subjected to a relatively weak pixel replacement rule shown in FIG. 6B, in which cyan (C) pixels located at the boundaries at which the cyan pixels are adjacent to black (K) pixels are decimated in zigzag formation. A pixel replacement rule shown in FIG. 6C, which is a comparatively strong pixel replacement rule, has a zigzag replacement of black pixels with cyan pixels in the boundary area in addition to the decimation of cyan pixels shown in FIG. 6B. The pixel replacement rule shown in FIG. 6C is selected when the predicted bleeding occurrence level is "intermediate".

In the above-mentioned algorithm the suitable pixel replacement rule is selected based on the predicted bleeding occurrence level, so that bleeding can be prevented effectively and efficiently.

A description will now be given, with reference to FIGS. 7A-7C, 8, 9A-9C, 10A and 10B, and 11A and 11B, of a process for selection of the printing mode by the printing control unit 18. FIGS. 7A-7C, 8, 9A-9C, 10A and 10B, and 11A and 11B respectively show different printing modes.

FIGS. 7A through 7C show the batch printing mode, or the regular printing mode. A capital letter "G" is printed with black ink, and its periphery is printed with cyan ink as shown in FIGS. 7A and 7B. As shown in FIG. 7C, a black ink head 24K and a cyan ink head 24C are simultaneously driven to form an image consisting of black and cyan inks. A reference numeral "1" shown in FIG. 7C denotes the number of times that printing is performed to complete the image shown in FIG. 7A. It is to be noted that attention to only cyan is paid in FIGS. 7A through 11B for the sake of simplicity and heads for magenta (M) and yellow (Y) arranged side by side together with the cyan ink head 24C are omitted from illustration.

FIG. 8 shows another printing mode in which the image of FIG. 7A is realized by doing scan twice so that black ink and color inks (cyan ink in this case) are printed at different timings and are fixed with a time difference. The first scan prints black ink and the second scan prints cyan ink. Fixing of black ink is already completed when the second scan is initiated, so that bleeding can be avoided.

FIGS. 9A through 9C show a yet another printing mode having pixel decimation. FIGS. 9A and 9B show the same image as those of FIGS. 7A and 7B. The present printing mode is suitable for segmented printing. The image shown in FIG. 9A is completed by doing scan three times. The first scan uses the lower half of the black ink head 24K and the lower half of the cyan ink head 24C, and prints black ink and cyan ink in a decimated zigzag pixel arrangement. The second scan uses the whole black ink head 24K and the whole cyan ink head 24C, and completes the upper half of the printed image while printing black and cyan inks in the decimated zigzag pixel arrangement. The third scan uses the lower half of the black ink head 24K and the lower half of the cyan ink head 24C, and prints black and cyan inks in the zigzag pixel arrangement, so that the image can be completed.

Figures 10A, 10B:
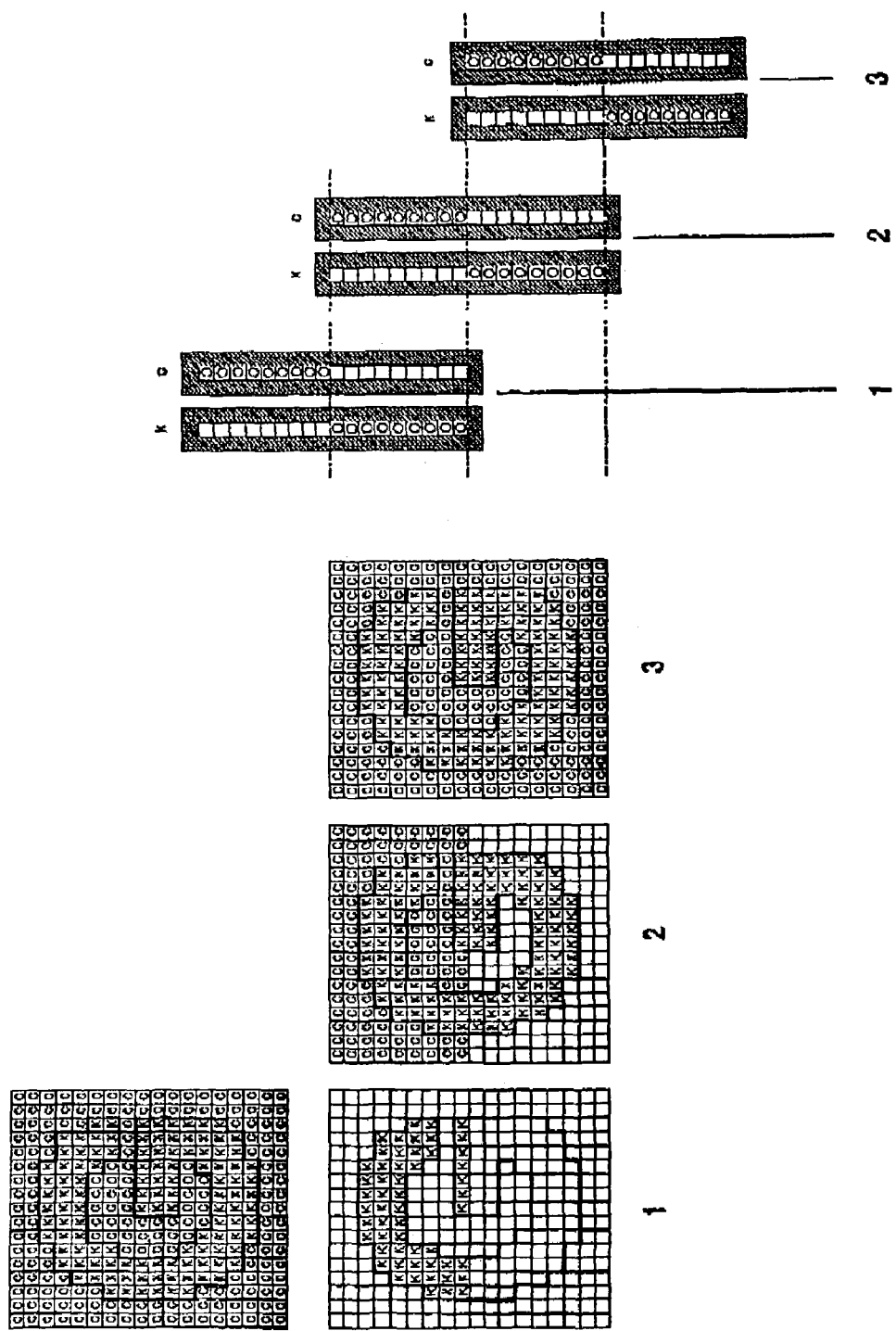
FIGS. 10A and 10B illustrate a further printing mode.

FIGS. 10A and 10E show a printing mode in which scan is done three times. The present printing mode uses only the lower half of the black ink head 24K and only the upper half of the cyan ink head 24C. The first scan prints black ink to complete the upper half of the printed image, and the second scan prints black ink to complete the lower half while printing cyan ink to complete the upper half. The third scan prints cyan ink to complete the lower half of the printed image. The printing mode shown in FIGS. 10A and 10B is suitable for the segmented printing mode. In this mode, black ink and color inks are printed in the different ranges (widths) of segmented printing mode in order to prevent black pixels and color pixels adjacent thereto from being simultaneously printed. It is therefore possible to secure the enough time (time difference) to fix black ink before scan of color inks is initiated. In the printing mode shown in FIGS. 10A and 10B, the printing speed decreases only when printing control is switched (not shown). It is therefore possible to suppress decrease of the printing speed due to printing control as small as possible.

FIGS. 11A and 11B show a still further printing mode in which the same image as shown in FIGS. 7A, 8, 9A and 10A is completed by doing scan six times. The first scan prints the upper half of the printed image with black ink in the decimated formation, and the second scan prints the upper half thereof with cyan ink in the decimated formation. The third scan prints the upper half of the image with black ink in the decimated formation, and prints the lower half with black ink in the decimated formation, so that the upper half to be printed with black ink can be completed. The fourth scan prints the upper half of the printed image with cyan ink in the decimated formation, and prints the lower half with cyan ink in the decimated formation, so that the upper half to be printed with cyan ink can be completed. The fifth scan prints the lower half of the image with black ink in the decimated formation, and prints the lower half with cyan ink in the decimated formation, so that the lower half to be printed with cyan ink can be completed.

In the printing modes shown in FIGS. 7A through 11B, if the printing mode is switched every main scan, the different main scans have different orders of printing inks by merely separating black ink and CMY inks from each other, so that color unevenness may take place on the band (main scan) basis. In order to avoid the above possibility, it is possible to define a rule that prevents a particular combination of printing modes resulting from the band-based (scan-based) prediction of bleeding occurrence level. Further, in a dual-direction printing mode, the fixed order of printing K and CMY inks or the fixed order of printing CMY inks may be used in reciprocating scan, so that color unevenness can be suppressed.

Figure 12:
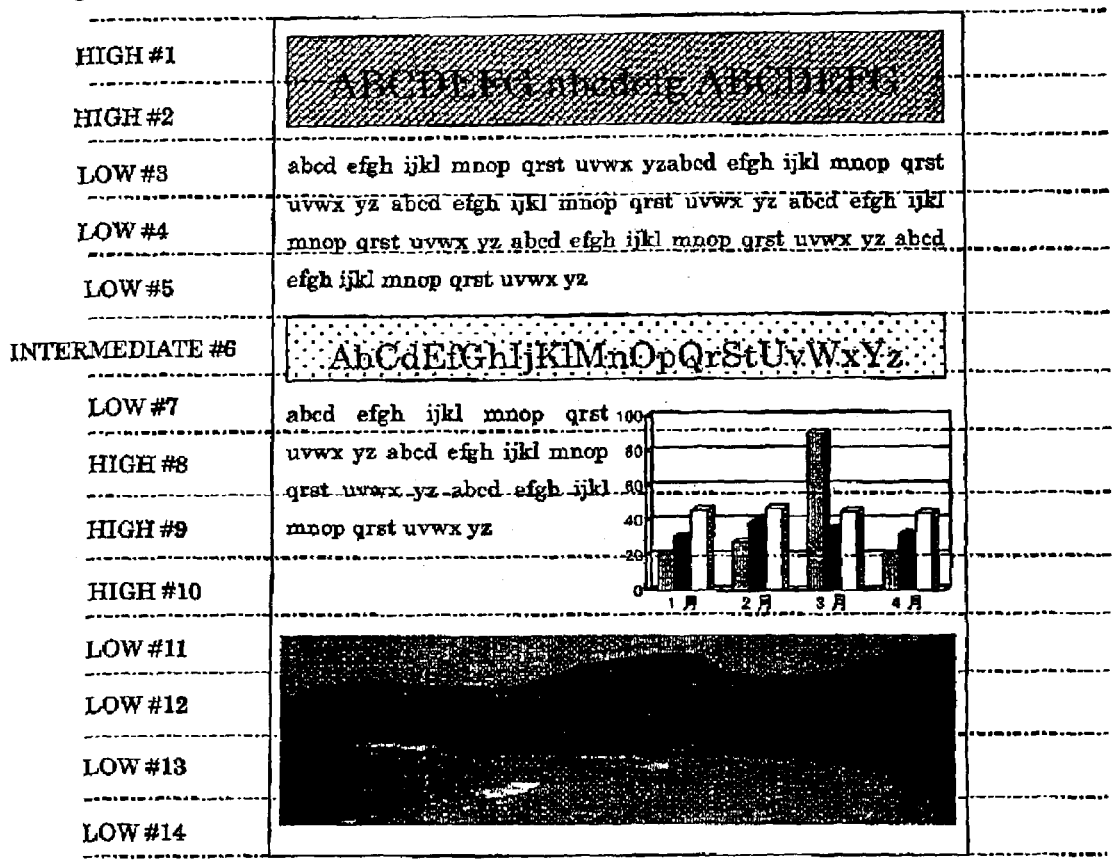
FIG. 12 illustrates an example of the pixel replacement and switching of the printing control.

FIG. 12 shows an example of the pixel replacement process and switching the printing control in color image processing according to the present invention. The results of prediction of bleeding occurrence level obtained for each main scan are shown on the left side of FIG. 12. The "high" bleeding occurrence level indicated by #1 and #2 is predicted, at step S23 shown in FIG. 3, for an image having letters printed with black ink in a color background printed with a large quantity of inks. The "low" bleeding occurrence level indicated by #3 -#5 is predicted, at step S26 in FIG. 3, for an image printed with black ink in a plain (white) background having no boundaries. The "intermediate" bleeding occurrence level indicated by #6 is predicted, at step S24, for an image having letters printed with black ink in a color background printed with a small quantity of inks. The "low" bleeding occurrence level indicated by #7 is predicted, at step S26 in FIG. 3, for an image having letters printed with black ink in a plan background. The "high" bleeding occurrence level indicated by #8-#10 is predicted, at step S23 in FIG. 23, for an image having bar graphs having many boundaries and much inks. The "low" bleeding occurrence level indicated by #11-#14 is predicted, at step S26, for a picture (photograph) having a small number of boundaries and a little ink. The text/graphics-based images are subject to the appropriate bleeding preventing process based on the quantity of inks, and the picture-based images in which bleeding is originally less visible are not subject to the printing control more than necessary. Thus, bleeding can be avoided while high printing efficiency can be maintained.

FIG. 13 shows the degree of bleeding and printing speed by the present invention and three comparative examples. The first comparative example shown at the top of the table does not execute any bleeding preventing process and printing control (regular printing mode). In this case, large bleeding occurs (denoted by "X") although the printing speed is high (normalized as "1"). The second comparative example employs only the pixel replacement process, in which bleeding is improved to some extent (denoted by "Δ"). The third comparative example employs the printing control only, in which bleeding is improved but the printing speed is reduced to half the printing speed of the first comparative example. In contrast, according to the present invention, bleeding can be prevented without decreasing the printing speed greatly.

The present invention is not limited to the specifically disclosed embodiments, and other embodiments, variations and modifications may be made without departing from the scope of the present invention. For example, the configuration shown in FIG. 1 may be varied so that a suitable one of the bleeding occurrence levels provided in the bleeding-occurrence-level determination unit 12 can be selected in accordance with print paper (paper quality or type) and print quality specified by the user. Bleeding depends on the paper quality. Bleed also relates to the print quality desired by the user. For example, in FIG. 5, the "strong" pixel replacement process shown in FIG. 6C may be used at the "high" bleeding occurrence level by the user's setting. It is therefore possible to flexibly select the degree of avoidance of bleeding and the printing speed in accordance with the user's request. It is also possible to change the conditions for predicting the bleeding occurrence level in accordance with the user's request. The conditions may be the threshold level Lth used at steps S13 and S19 shown in FIG. 2.

It is also possible to define a larger number of level values of the bleeding occurrence level.

What is claimed is:

1. A color image processing apparatus comprising:
   a first unit that predicts a bleeding occurrence level from input image data;
   a second unit that replaces pixels in a given area having boundaries between black ink and any of color inks with another pixels in accordance with the bleeding occurrence level; and
   a third unit that controls switching of multiple printing modes for each main scan in accordance with the bleeding occurrence level, wherein:
   the bleeding occurrence level is set at a first level value when it is recognized that there is a number of boundaries exceeding a first threshold value at which black pixels are adjacent to color pixels and a quantity of inks exceeding a second threshold value is used at the boundaries; and
   the bleeding occurrence level is set at a second level lower than the first level when it is recognized that there is a number of boundaries exceeding the first threshold value and a quantity of inks smaller than the second threshold value is used at the boundaries.

2. A color image processing apparatus comprising:
   a first unit that predicts a bleeding occurrence level from input image data;
   a second unit that replaces pixels in a given area having boundaries between black ink and any of color inks with another pixels in accordance with the bleeding occurrence level; and
   a third unit that controls switching of multiple printing modes for each main scan in accordance with the bleeding occurrence level, wherein:
   the bleeding occurrence level is set at a first level when it is recognized that there is a number of boundaries smaller than a first threshold value at which black pixels are adjacent to color pixels and a quantity of inks exceeding the second threshold value is used at boundaries at which pixels containing black and color inks are adjacent to color pixels; and
   the bleeding occurrence level is set at a second level lower than the first level when it is recognized that there is a number of boundaries smaller than the first threshold value at which black pixels are adjacent to color pixels and a quantity of inks smaller than the second threshold value is used at boundaries at which pixels containing black and color inks are adjacent to color pixels.

* * * * *